June 20, 1967  S. C. SMITH  3,326,544
SHOCK ABSORBER FOR VEHICLES
Filed March 29, 1965  3 Sheets-Sheet 1

INVENTOR.
STUYVESANT C. SMITH
BY *M. A. Hobbs*
ATTORNEY

June 20, 1967  S. C. SMITH  3,326,544
SHOCK ABSORBER FOR VEHICLES
Filed March 29, 1965  3 Sheets-Sheet 2
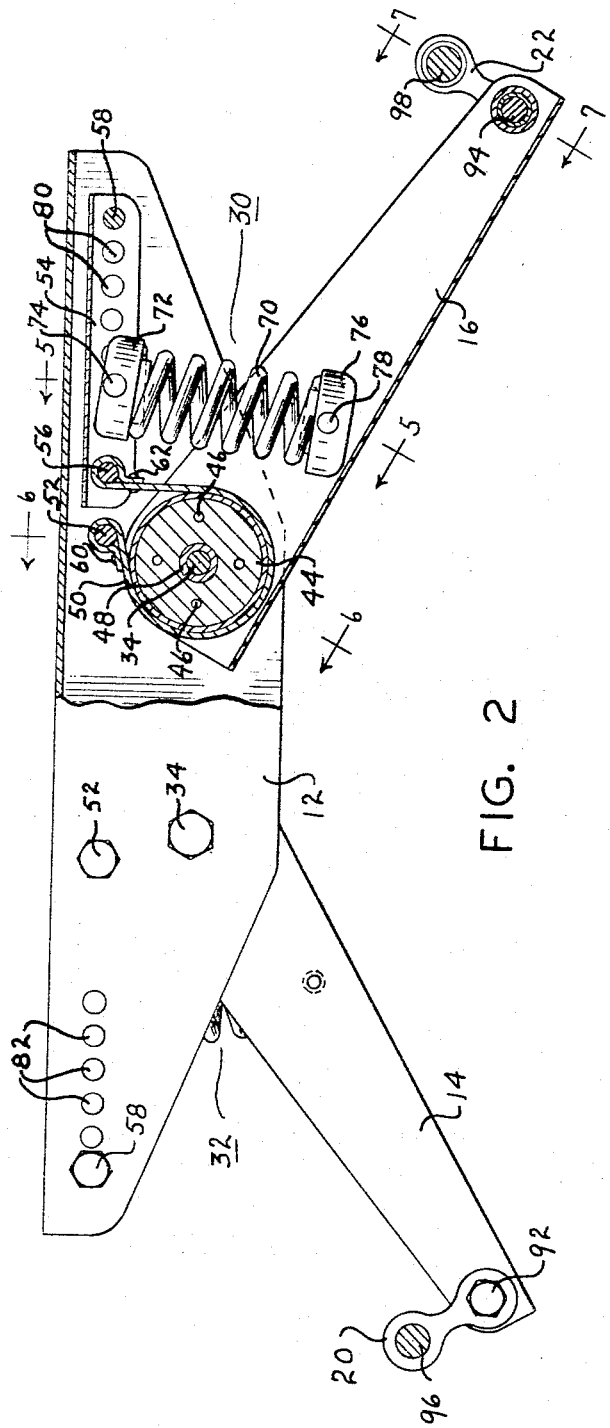
INVENTOR.
STUYVESANT C. SMITH
BY M. A. Hobbs
ATTORNEY

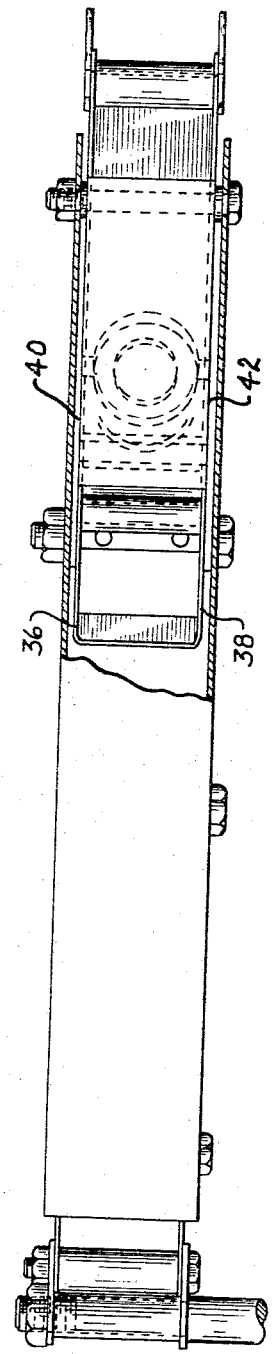

United States Patent Office 3,326,544
Patented June 20, 1967

3,326,544
SHOCK ABSORBER FOR VEHICLES
Stuyvesant C. Smith, 15026 Dragoon Trail,
Mishawaka, Ind. 46544
Filed Mar. 29, 1965, Ser. No. 443,559
9 Claims. (Cl. 267—20)

The present invention relates to a vehicle suspension system and more particularly to a shock absorbing suspension system of vehicles.

One of the principal difficulties with conventional mechanical shock absorbers is in obtaining effective operation with various loads placed on or in the vehicle and various magnitudes of bumps and shocks to which it is subjected while the vehicle is being driven, and especially in obtaining effective, smooth and reliable adjustment to the various loads and road conditions. As the load on the vehicle is increased, the shock absorbers are necessarily compressed to compensate for the increased load, thus leaving less effective operating movement in the mechanism for absorbing the shock; consequently, the mechanism readily reaches its maximum limit of travel when excessive road shock and jarring occur. Various attempts have been made to compensate for the increased load, these usually involving compound springs or a combination of springs and rubber bumper elements, which successively become effective as the load or magnitude of the shock is increased. This type of compensation, however, normally has a pronounced step effect which can be felt by the occupants of the vehicle and will not effectively compensate for any number of different load and road conditions. It is therefore one of the principal objects of the present invention to provide a sock absorbing suspension system which increases the riding comfort of the occupants and which gives safe operation of the vehicle, in that the system results in the vehicle wheels being on the ground rather than bouncing throughout most of the operation over uneven road conditions.

Another object of the present invention is to eliminate the usual rebound from road shock experienced by conventional shock absorbers and thereby to increase the life of the vehicle, and to eliminate the bouncing sensation to the occupants normally encountered in the standard shock absorbers by a substantially increased stroke through which the shock is taken.

Another object of the present invention is to provide a relatively simple mechanical shock absorber which can easily be incorporated in the conventional undercarriage of standard automobiles and which is so constructed and designed that it requires little service to maintain optimum performance and is virtually trouble-free.

Still another object of the invention is to provide a shock absorber of the aforesaid type which can be readily adapted to various types of vehicles, including automobiles, trucks, buses, trailers and motorcycles, and bumpers and landing gears, and which is sturdy in construction and reliable in operation and performance.

A further object is to provide a shock absorber mechanism which can be readily constructed with a relatively small number of easily fabricated parts and which is so designed that the moving parts are subjected to little wear over long periods of time from normal operation of the vehicle.

Another object of the invention is to provide a mechanism for a mechanical shock absorber which utilizes a single spring in combination with a variable friction mechanism to compensate for the variations in load and magnitudes of shock, and which utilizes the spring and friction effect throughout the entire load and road responsive movement to provide infinitely variable compensation and eliminate the stored energy effect of conventional spring action shock absorbers.

Additional objects and advantages of the invention will become apparent from the following description and accompanying drawings, wherein:

FIGURE 2 is an elevational view similar to that shown in FIGURE 1, with a portion of the housing broken away to show the shock absorber mechanism, the view showing the shock absorber in its unloaded position;

FIGURE 3 is an elevational view similar to that shown in FIGURE 1, illustrating the shock absorber in a substantially fully loaded position;

FIGURE 4 is a top plan view of the shock absorber shown in the preceding figures, with a portion broken away to illustrate more effectively the operating mechanism thereof;

Figure 1:
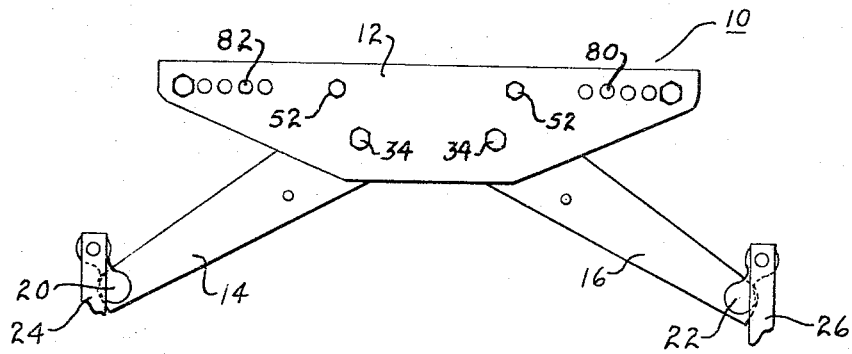
FIGURE 1 is an elevational view of the present complete shock absorber mechanism, showing it in the housing and frame structures therefor.
Figures 5, 6:
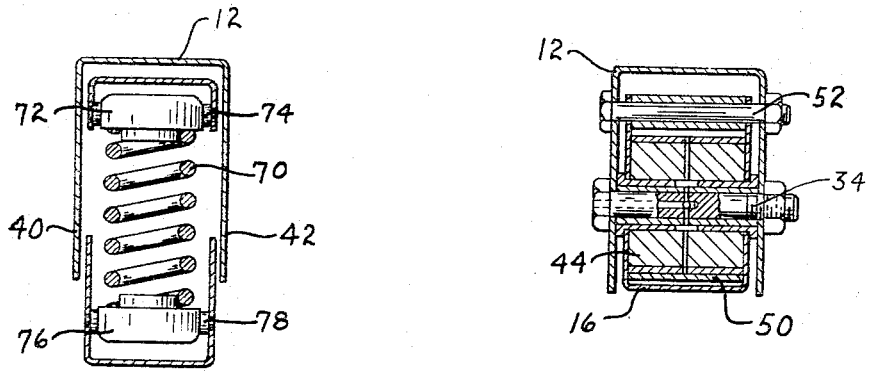
FIGURE 5 is a cross sectional view of a portion of the shock absorber mechanism in the preceding figures, the section being taken on line 5—5 of FIGURE 2.
FIGURE 6 is a cross sectional view of another portion of the mechanism, the section being taken on line 6—6 of FIGURE 2.

Referring more specifically to the drawings and to FIGURES 1, 2 and 3 in particular, numeral 10 designates generally the present complete shock absorber structure, 12 the upper frame of the shock absorber, 14 and 16 the left and right arms thereof connected by shackles 20 and 22 and brackets 24 and 26, respectively, to the axle of the vehicle on which the present shock absorber is mounted. The frame is secured to the underside and supports the bed or body of the vehicle and is attached rigidly thereto by bolts, rivets or other suitable securing means (not shown). The present shock absorber is readily adaptable to various types of vehicles, including automobiles, trucks, buses and motorcycles, including motorcycles having sidecars or the like. In view of the adaptability of the present shock absorber to the various vehicles of well known construction, the manner in which the shock absorber is connected to the body or frame and axles will not be described in detail herein. Changes may be required, however, in the size and relationship of the frame members and arms to one another in adapting the present unit to various vehicles, and changes in size and strength of the shock absorbers would necessarily have to be made when they are incorporated in the respective vehicles.

Referring to FIGURES 2, 3 and 4, in which a portion of the drawings is broken away to illustrate better the operating mechanism of the shock absorber 30, only one of the two mechanisms will be shown and described in detail herein, since the other mechanism generally designated by the numeral 32 is identical in construction and operation to mechanism 30. The mechanism 30 consists of arm 16 pivotally mounted on bolt 34, extending through aligned holes in the upper end of the arm and through aligned holes in sides 36 and 38 of arm 16 and corresponding aligned holes in sides 40 and 42 of upper frame 12. The arm is free to pivot from the position shown in FIGURE 2 to the position shown in FIGURE 3. Mounted on bolt 34 in frame 12 is a friction or brake drum 44 which is rigidly secured to arm 16 by welding or by bolts 46 extending into the two sides 36 and 38 through drum 44. The drum, however, is mounted on a bearing 48 and is free to rotate relative to bolt 34. A brake band 50 is mounted on the periphery of brake drum 44 and is anchored at one end on bolt 52 supported by and extending through side walls 40 and 42 of frame 12, and anchored at the opposite end by pin 56 to a pivoted lever 54 mounted between side walls 40 and 42 and pivoted thereto by a bolt 58. The free end of lever 54, to which the brake band is fastened, is adapted to move toward and away from the brake drum and thereby to release and tighten the band on drum 44, as will be more fully explained hereinafter. The opposite ends of the band extend around bolts 52 and pin 56 and are secured to the band by rivets 60 and 62 or other suitable securing means.

The left hand end of lever 54 is urged upwardly by a coil spring 70 seated at its upper end in a spring retainer 72 pivoted to lever 54 by a pin 74 and seated at its lower end in a spring retainer 76 pivoted by pin 78 to arm 16. The spring urges the arm 16 downwardly and reacts between the arm and lever 54 and provides the primary load and shock compensating force of the mechanism. It is seen that as arm 16 is moved upwardly as the load on the vehicle is increased or as the magnitude of the shock is increased, pressure is applied to lever 54 which in turn applies a force to band 50 and, since the opposite end of band 50 is anchored on bolt 52, draws the band in varying degrees tightly around the periphery of drum 44. In order to vary the adjustment of the shock absorber mechanism to accommodate various loads or preferences of the vehicle occupants, a series of holes 80 and 82 is provided in frame 12 and for lever 54 so that the fulcrum point 58 may be shifted. As the fulcrum bolt 58 is moved toward spring retainer 72 or as pin 74 and spring retainer 72 are moved toward fulcrum 58 by inserting either bolt 58 or pin 74 in holes 80, a greater load and shock magnitude is required to tighten band 50 around drum 44. The bolt point 58 may be shifted in any selected position by inserting the bolt through selected holes 80 and 82 extending through the side walls of lever 54 and side walls 40 and 42 of frame 12, respectively, and the pin may be shifted by inserting pin 56 in any selected holes 80, thus placing the spring in closer proximity to pivot bolt 58.

Figure 7:
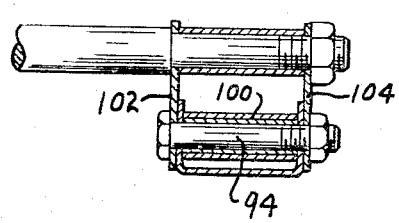
FIGURE 7 is a cross sectional view of the attachment used in connecting the present shock absorber to the axle of a vehicle.

Shackles 20 and 22 are secured to the free end of arms 14 and 16, respectively, by bolts 92 and 94 extending through sides 36 and 38 of the respective arms and are pivoted to fixtures 24 and 26 by bolts 96 and 98, the two fixtures being connected to the axle by any suitable attaching means (not shown). The details of the shackle are illustrated more clearly in FIGURE 7 and include a bearing 100 and side members 102 and 104 extending between arm 16 and fixture 26.

The operation of the present shock absorber is effectively illustrated in FIGURES 2 and 3, FIGURE 2 showing the position of the mechanism when the vehicle is unloaded or has only a light load thereon, and is not absorbing any road shock. FIGURE 3 illustrates the position when the vehicle is fully loaded or over-loaded, or when an excessive shock has been transmitted through the undercarriage of the vehicle to the shock absorber mechanism. As load is applied to the vehicle or as the vehicle absorbs shock from the road through the wheel and axle, the arm 16 is pivoted upwardly on bolt 34 transmitting the load or shock force to spring 70 which reacts between arm 16 and lever 54, thus urging the free end of lever 54 upwardly as it pivots on bolt 58. As the free end of the lever moves upwardly, it pulls band 50 tighter around drum 44 and thereby produces an increased friction on the surface of the drum. Since the drum is rigidly connected to arm 16, a resistance to the movement of arm 16 is created and increased as the pressure applied by the band is increased, the pressure of the band being increased as the pressure of spring 70 applied to lever 54 is increased.

It is thus seen that as the load is increased on the vehicle, arms 14 and 16 move to a position intermediate between that shown in FIGURE 2 and FIGURE 3, and as long as the vehicle is stationary or traveling over a smooth surface, the arms will remain in that relative position. As the load is placed on the vehicle and the arms move to the intermediate position, the force of spring 70 on lever 54 is increased, thereby tightening band 50 on drum 44, and thereby increasing the resistance of arm 16 to the pivotal movement thereof. Consequently, when the arm is subjected to a shock transmitted through the vehicle wheels and axle, the spring tends to compress further and thereby apply greater pressure to lever 54, which in turn increases the pressure of band 50 on drum 44, further increasing the resistance to the movement of arm 16. When the maximum load has been placed on the automobile or it is subjected to excessive shock, the mechanism may assume the position shown in FIGURE 3 with spring 70 substantially fully compressed and band 50 held tightly around drum 44. As the load is lightened, the arms 14 and 16 return to their original position and the pressure applied by spring 70 on lever 54 is reduced, thereby reducing the pressure applied by band 50 on drum 44. When the vehicle is in its normal unloaded position, a slight pressure is constantly applied by band 50 to the drum as a result of the normal vehicle body or bed load on frame 12 and arms 14 and 16.

The foregoing structure can be rearranged so that pull springs or rubber shock members or cords can be used in place of the compression springs 70. While only one embodiment of the present invention has been described in detail herein, various changes and modifications may be made without departing from the scope of the invention.

I claim:

1. A shock absorbing suspension system for a vehicle having a body and axle, comprising a frame for connection with the body having two spaced downwardly extending side walls, two arms pivoted on said frame between said side walls, each extending from its pivot point toward the adjacent side and normally at a downward angle, said arms having spaced upwardly extending sides, each of said arms having in cooperation therewith: a drum mounted on said arm with its axis on the arm pivot and secured to the arm for rotation therewith, a lever pivoted on said frame and having a free end adjacent said drum, an adjustable means for pivoting said lever on said frame, a band around said drum having one end anchored on said frame and the other end on the free end of said lever adjacent said drum, a compression spring connected at one end to said arm and at the other end to said lever and being disposed between the respective side walls, and a shackle on the free end of each arm for connecting the arm to the axle.

2. A shock absorbing suspension system for a vehicle having an undercarriage, comprising a frame having two spaced downwardly extending side walls, two arms pivoted on said frame between said side walls, each extending from its pivot point toward the adjacent side and normally at a downward angle, said arms having spaced upwardly extending sides, each of said arms having in cooperation therewith: a drum mounted on said arm with its axis on the arm pivot and secured to the arm for rotation therewith, a lever pivoted on said frame and extending from its pivot toward said drum, a band around said drum having one end anchored on said frame and the other end on the free end of said lever adjacent said drum, a compression spring connected at one end to said arm and at the other end to said lever and being disposed between the respective side walls, and a shackle on the free end of each arm for connecting the arm to the undercarriage.

3. A shock absorber mechanism for a vehicle having an undercarriage, comprising a frame, two arms pivoted on said frame, each extending from its pivot point toward the adjacent side and normally at a downward angle, each of said arms having in cooperation therewith: a drum mounted on said arm with its axis on the arm pivot and secured to the arm for rotation therewith, a lever having a free end adjacent said drum, an adjustable means for pivoting said lever on said frame, a band around said drum having one end anchored on said frame and the other end on the free end of said lever adjacent said drum, a compression spring connected at one end to said arm and at the other end to said lever, and a shackle on the free end of each arm for connecting the arm to the undercarriage.

4. A shock absorber mechanism for a vehicle, comprising a frame, two arms pivoted on said frame, each extending from its pivot point toward the adjacent side and normally at a downward angle, each of said arms having in cooperation therewith: a drum mounted on said arm with its axis on the arm pivot and secured to the arm for rotation therewith, a lever pivoted on said frame and extending from its pivot toward said drum, a band around said drum having one end anchored on said frame and the other end on the free end of said lever adjacent said drum, and a compression spring connected at one end to said arm and at the other end to said lever.

5. In a shock absorber mechanism for a vehicle, a frame, and an arm pivoted on said frame: a drum secured to said arm with its axis on the arm pivot, a lever having a free end adjacent said drum, an adjustable means for pivoting said lever on said frame, a band round said drum having one end anchored on said frame and the other end on the free end of said lever adjacent said drum, and a compression spring connected at one end to said arm and at the other end to said lever.

6. A shock absorber mechanism for a vehicle, comprising a frame, two arms pivoted on said frame, each of said arms having in cooperation therewith: a drum mounted on said arm with its axis on the arm pivot and secured to the arm for rotation therewith, a lever pivoted on said frame and extending from its pivot toward said drum, a band around said drum having one end anchored on said frame and the other end on the free end of said lever adjacent said drum, and a compression spring connected at one end to said arm and at the other end to said lever.

7. A shock absorber mechanism for a vehicle having an undercarriage, comprising a frame having two spaced downwardly extending sides, an arm pivoted on said frame and having spaced upwardly extending sides, a drum mounted on said arm with its axis on the arm pivot and secured to the arm for rotation therewith, a lever pivoted on said frame and having a free end adjacent said drum, an adjustable means for pivoting said lever on said frame, a band around said drum having one end anchored on said frame and the other end on the free end of said lever adjacent said drum, a compression spring connected at one end to said arm and at the other end to said lever and being disposed between the respective side walls, and a shackle on the free end of each arm for connecting the arm to the undercarriage.

8. A shock absorber mechanism for a vehicle, comprising a frame, an arm pivoted on said frame, a lever pivoted on said frame and extending from its pivot toward said drum, a band around said drum having one end anchored on said frame and the other end on the free end of said lever adjacent said drum, and a compression spring connected at one end to said arm and at the other end to said lever.

9. A shock absorber mechanism for a vehicle, comprising a frame, an arm pivoted on said frame, a drum secured to said arm with its axis on the arm pivot, a pivoted lever extending from its pivot toward said drum, a band around said drum having one end anchored on said frame and the other end on the free end of said lever adjacent said drum, and a compression spring connected at one end to said arm and at the other end to said lever.

No references cited.

ARTHUR L. LA POINT, *Primary Examiner.*

R. M. WOHLFARTH, *Assistant Examiner.*